Dec. 29, 1936. C. H. JOLLY 2,065,528
CHUCK FOR AIRPLANE WHEELS
Filed Oct. 16, 1935
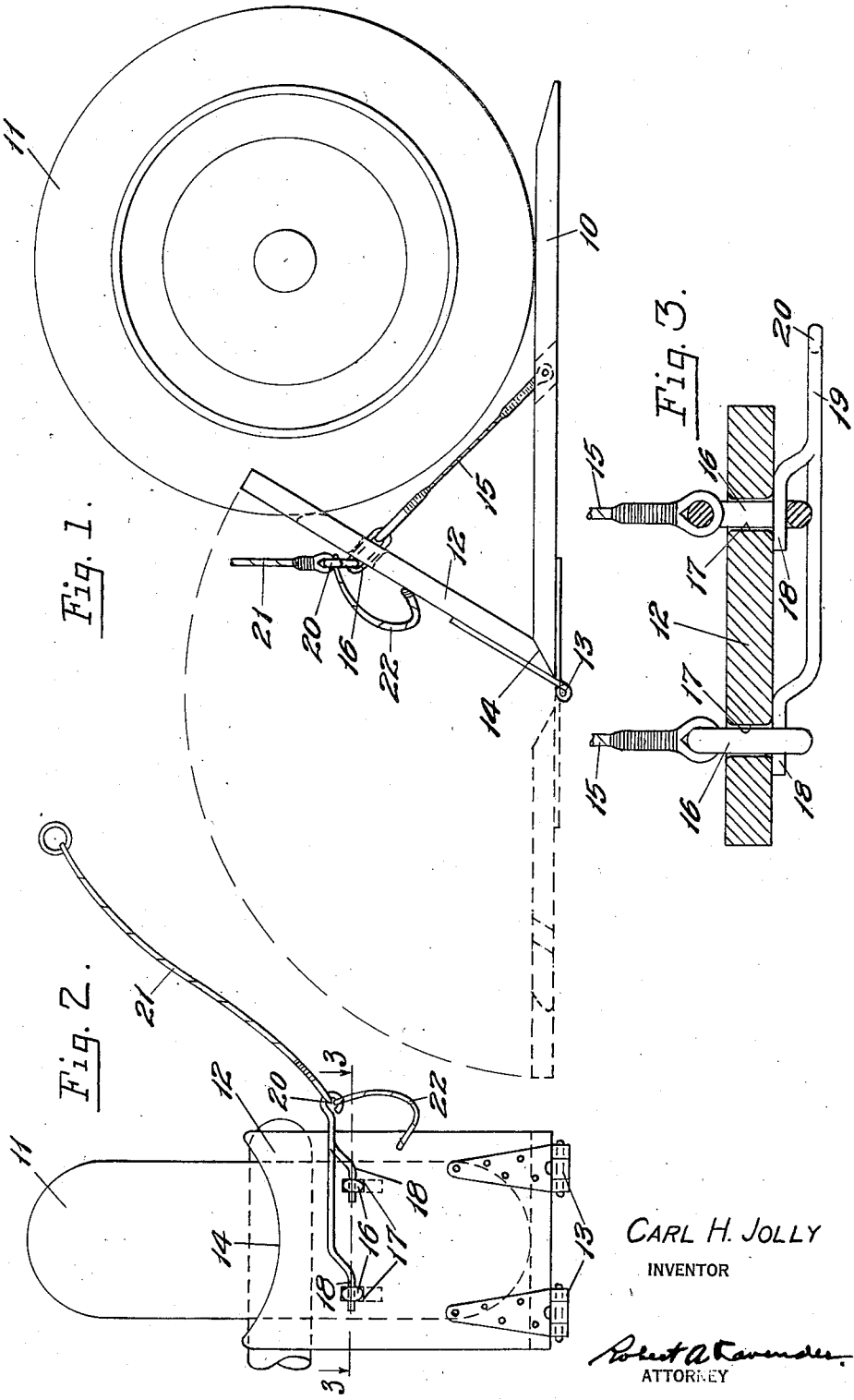
CARL H. JOLLY
INVENTOR
ATTORNEY Patented Dec. 29, 1936

2,065,528

UNITED STATES PATENT OFFICE 2,065,528

CHUCK FOR AIRPLANE WHEELS

Carl H. Jolly, United States Navy

Application October 16, 1935, Serial No. 45,196

8 Claims. (Cl. 188—32)

(Granted under the act of March 3, 1883, as amended April 30, 1928; 370 O. G. 757)

This invention relates to wheel chucks, and it has a particular relation to chucks of a collapsible type for releasably obstructing the movement of the wheels of an airplane or the like.

The principal object of the present invention is the provision of a simple and efficient wheel chuck of light weight construction which may be operated from the side and at a safe distance from the airplane propeller, or propellers, and which may be collapsed into compact form for storage in the airplane.

With these and other objects in view, as well as other advantages which may be incident to the use of the improvements, the invention consists of the parts and combinations thereof hereinafter set forth and claimed, with the understanding that the several necessary elements constituting the same may be varied in proportion and arrangement without departing from the nature and scope of the invention, as defined in the appended claims.

In order to make the invention more clearly understood, there are shown in the accompanying drawing means for carrying the invention into practical effect, without limiting the improvements in their useful application to the particular construction, which, for purposes of explanation, have been made the subject of illustration.

In the accompanying drawing:

Fig. 1 is a side elevational view of a wheel chuck embodying the present invention;

Fig. 2 is a front elevational view of the structure shown in Fig. 1, and

Fig. 3 is an enlarged transverse sectional view taken on line 3—3 of Fig. 2.

Referring to the drawing, a wheel chuck constructed in accordance with the present invention is shown as comprising a base 10 which rests upon the ground and supports a wheel 11 of an airplane. An abutment in the form of a plate 12 is connected at its lower edge by hinges 13 to the forward edge of the base 10 and is formed with an inwardly curved upper edge 14, conforming in curvature with that of the tire of the wheel 11. The adjacent edges of the base 10 and abutment 12 are chamfered, as at 14, so as to provide a stop to limit swinging movement of the abutment to the right, as viewed in Fig. 1. The abutment 12 is releasably retained in the position shown by means of a pair of cables 15, each having its lower end secured to the base 10 and provided at its upper end with a link 16 extending through an opening 17 formed in the abutment 12. The links 16 are releasably retained in position by pins 18 having a common shank portion 19 formed with an eye 20, to which a thong 21 is attached. The pins 18 are prevented from becoming lost or misplaced by a short cord 22 attached to the abutment 12.

When it is desired to release the wheels of the airplane, one of the ground crew, standing at one side of the airplane at a safe distance from the propeller, exerts a pull upon the thong 21 of sufficient force to withdraw the pins 18 from the links 16. The abutment 12 being thus released is swung by the wheel 11 to the horizontal position indicated by the dotted lines in Fig. 1, so as to permit the wheel to roll over the same.

When the chuck is not in use the plate 12 may be swung backwardly around so as to lie parallel with the base 10, thus forming a compact article for storage in an airplane. If desired, the chuck may be constructed of sheet metal and the latch mechanism may be metal straps, provided with suitable apertures.

Other modifications and changes in the proportions and arrangement of the parts may be made by those skilled in the art without departing from the nature and scope of the invention, as defined in the appended claims.

The invention described herein may be manufactured and used by or for the Government of the United States of America for governmental purposes without the payment of any royalties thereon or therefor.

What is claimed is:

1. A chuck for an airplane wheel or the like comprising a base for supporting the wheel, and an abutment mounted on said base for movement between an operative position in the path of travel of the wheel, in which it obstructs the movement thereof in a forward direction, and an inoperative position without said path in which said wheel is released, said abutment being disposed in contact with the ground and in the same plane with said base when occupying its inoperative position to provide a track for said wheel.

2. A chuck for an airplane wheel or the like comprising a base for supporting the wheel, and an abutment mounted on said base for swinging movement between an operative position in the path of travel of the wheel, in which it obstructs the movement thereof in a forward direction, and an inoperative position without said path in which said wheel is released, said abutment being disposed in contact with the ground and in the same plane with said base when occupying its inoperative position to provide a track for said wheel.

3. A chuck for an airplane wheel or the like comprising a base for supporting the wheel, and an abutment mounted on said base for swinging movement about a horizontal axis between an operative position in the path of travel in which it obstructs the movement thereof in a forward direction, and an inoperative position without said path in which said wheel is released, said abutment being disposed in contact with the ground and in the same plane with said base when occupying its inoperative position to provide a track for said wheel.

4. A chuck for an airplane wheel or the like comprising a base plate for supporting the wheel, and a plate hinged to the forward edge of said base plate for swinging movement between an operative position in the path of travel of the wheel, in which it obstructs the movement thereof in a forward direction, and an inoperative horizontal position without said path in which said wheel is released, said abutment being disposed in contact with the ground and in the same plane with said base when occupying its inoperative position to provide a track for said wheel.

5. A chuck for an airplane wheel or the like comprising a base for supporting the wheel, an abutment mounted on said base for movement between an operative position in the path of travel of the wheel and an inoperative position without said path in which said wheel is released, and latch means for releasably retaining said abutment in its operative position, said abutment being disposed in contact with the ground and in the same plane with said base when occupying its inoperative position to provide a track for said wheel.

6. A chuck for an airplane wheel or the like comprising a base for supporting the wheel, an abutment mounted on said base for movement between an operative position in the path of travel of the wheel and an inoperative position without said path in which said wheel is released, and latch means connecting said base and said abutment for releasably retaining said abutment in its operative position, said abutment being disposed in contact with the ground and in the same plane with said base when occupying its inoperative position to provide a track for said wheel.

7. A chuck for an airplane wheel or the like comprising a base for supporting the wheel, an abutment mounted on said base for movement between an operative position in the path of travel of the wheel and an inoperative position without said path in which said wheel is released, and latch means, including a flexible member connecting said abutment with said base, for releasably retaining said abutment in its operative position, said abutment being disposed in contact with the ground and in the same plane with said base when occupying its inoperative position to provide a track for said wheel.

8. A chuck for an airplane wheel or the like comprising a base for supporting the wheel, an abutment mounted on said base for movement between an operative position in the bath of travel of the wheel and an inoperative position without said path in which said wheel is released, means releasably connecting said base with said abutment, said means including a link extending through an aperture in the latter, and a pin extending through said link and retractable therefrom to release said abutment and the wheel retained thereby.

CARL H. JOLLY.